United States Patent
Kowalewski

(10) Patent No.: US 7,406,138 B1
(45) Date of Patent: Jul. 29, 2008

(54) METHOD AND DEVICE FOR ESTIMATING MEMORY-ENABLED TRANSMISSION CHANNELS

(75) Inventor: Frank Kowalewski, Salzgitter (DE)

(73) Assignee: IPCOM GmbH & Co., KG, Pullach (DE)

( * ) Notice: Subject to any disclaimer, the term of this patent is extended or adjusted under 35 U.S.C. 154(b) by 0 days.

(21) Appl. No.: 10/009,288

(22) PCT Filed: Apr. 5, 2000

(86) PCT No.: PCT/DE00/01399

§ 371 (c)(1),
(2), (4) Date: Apr. 4, 2002

(87) PCT Pub. No.: WO00/69133

PCT Pub. Date: Nov. 16, 2000

(30) Foreign Application Priority Data

May 6, 1999 (DE) ................................. 199 20 819

(51) Int. Cl.
*H04L 27/06* (2006.01)
(52) U.S. Cl. .................................................... 375/340
(58) Field of Classification Search ................ 375/148, 375/230, 130, 233, 316, 332, 340, 346; 455/226.2; 704/205, 233
See application file for complete search history.

(56) References Cited

U.S. PATENT DOCUMENTS

| | | | | |
|---|---|---|---|---|
| 5,251,233 A | * | 10/1993 | Labedz et al. | ................ 375/230 |
| 5,293,402 A | * | 3/1994 | Crespo et al. | ................ 375/233 |
| 5,450,453 A | * | 9/1995 | Frank | .......................... 375/130 |
| 5,809,086 A | * | 9/1998 | Ariyavisitakul | .............. 375/332 |
| 6,201,954 B1 | * | 3/2001 | Soliman | ................... 455/226.2 |
| 6,333,953 B1 | * | 12/2001 | Bottomley et al. | ........... 375/316 |
| 6,563,885 B1 | * | 5/2003 | Magee et al. | ................ 375/316 |
| 6,694,291 B2 | * | 2/2004 | Mauro et al. | ................. 704/205 |
| 2001/0001853 A1 | * | 5/2001 | Mauro et al. | ................. 704/233 |

FOREIGN PATENT DOCUMENTS

| | | |
|---|---|---|
| DE | 43 29 317 | 3/1995 |
| WO | WO 96 13910 | 5/1996 |
| WO | WO 98 40977 | 9/1998 |
| WO | WO 98 44655 | 10/1998 |

OTHER PUBLICATIONS

Sezan et al.; Estimation of the Parameters of a Multipath Channel Using Set-Theoretic Deconvolution; IEEE Transcations on Communications; vol. 40, No. 6; Jun. 1992; pp. 1006-1011.*

Boss et al.; Blind GSM Channel Estimation Based on Higher Order Statistics; 1997 IEEE International Conference on Communications; vol. 1; Jun. 8-12, 1997; pp. 46-50.*

Steiner et al., *Low Cost Channel Estimation in the Uplink Receiver of CDMA Mobile Radio Systems*, Frequenz, de, Schiele und Schon GmbH, Berlin, Germany, vol. 47, No. 11/12, Nov. 1, 1993, pp. 292-298.

* cited by examiner

*Primary Examiner*—Don N Vo
(74) *Attorney, Agent, or Firm*—Kenyon & Kenyon LLP

(57) ABSTRACT

A method for estimating memory-enabled transmission channels, having the following steps: determining a first estimation $\hat{h}$ of the pulse response of the transmission channel; estimating the additive interferences of the transmission channel; and correcting the first channel estimation while taking into consideration the estimation of the additive interferences. The first channel estimation is performed using a matched filter or a least squares estimation.

12 Claims, 1 Drawing Sheet

METHOD AND DEVICE FOR ESTIMATING MEMORY-ENABLED TRANSMISSION CHANNELS

FIELD OF THE INVENTION

The present invention relates to a method and a device for estimating memory-enabled transmission channels as used, e.g. in discrete-time communications systems, such as CDMA systems (CDMA=code division multiple access).

BACKGROUND INFORMATION

When transmitting data via memory-enabled channels, data parts separated over time are superposed. The resulting intersymbol interference of the data can be eliminated if the pulse response of the transmission channel is known. So-called channel estimators are used to determine the pulse response. They use information regarding the transmitted signal or the form of this signal to derive channel coefficients from the received signal. The most widely used channel estimators are based on a matched filter for a completely known reference signal r having optimum autocorrelation properties, i.e., r*r$\alpha\delta$, as seen, for example, in K. D. Kammeyer's "Nachrichtenübertragung," 2nd Ed., Information Technology Series, Teubner, Stuttgart, 1996. Non-optimum autocorrelation properties can be linearly corrected, yet inherent additive noise of the to be estimated transmission channel, e.g., in CDMA systems, generally results in transmission channel coefficient estimations that are higher than the actual values. It is known to partially correct these inaccurate transmission channel coefficient estimations using non-linear reworking. Thus, such a method, called the POCS method or POCS algorithm (POCS=projection onto convex sets), is known, for example, from the publication by Z. Kostic, M. I. Sezan and E. L. Titlebaum: "Estimation of the Parameters of a Multipath Channel Using Set-Theoretic Deconvolution", IEEE Trans. Comm., Vol. 40 (1992), 1006-1011. In this connection, reference is also made to the known MMSE algorithm (MMSE=minimum mean square error), which is described, e.g., in the K. D. Kammeyer monograph "Nachrichtenütbertragung" cited above. However, known techniques for correcting the pulse response estimation fail to take into consideration any additive interference estimations for the transmission channel.

However, in the case of currently known corrections of additive interferences when estimating memory-enabled transmission channels, it is disadvantageous that the methods produce correction results having varying accuracy for interferences of varying intensity. Moreover, threshold operations discontinuously correct coefficient values in the vicinity of the threshold value, thereby resulting in unnecessarily bad corrections.

SUMMARY OF THE INVENTION

Therefore, the object of the present invention is to provide a method and a device for estimating memory-enabled transmission channels, which provides an improved estimation of the channels, the quality of the estimation being as least dependent as possible on the additive interferences of the transmission channel.

The present invention relates to a method for estimating memory-enabled transmission channels, having the following steps:

(a) Determining a first estimation $\hat{h}$ of the transmission channel;

(b) Estimating the additive interferences of the transmission channel; and (c) Correcting the first channel estimation of step (a) while taking into account the estimation of the additive interferences of step (b).

Preferably, in the method according to the present invention, first channel estimation $\hat{h}$ of step (a) is carried out using a matched filter or a least squares estimation.

The device according to the present invention further includes a channel estimator and an estimator of the additive interferences acting on the received signal and further has a channel estimation correction that corrects the signal of the channel estimator while taking into the consideration the output signal of the estimator of the additive interferences.

Advantageously, the method provides improved estimations in comparison with other methods. The estimations are relatively independent of the intensity of the additive interferences. Small channel coefficients are estimated more precisely than in customary threshold value corrections. As a result, the new method can also be used to better equalize non-Nyquist pulse shaped signals.

DETAILED DESCRIPTION

Figure 1:
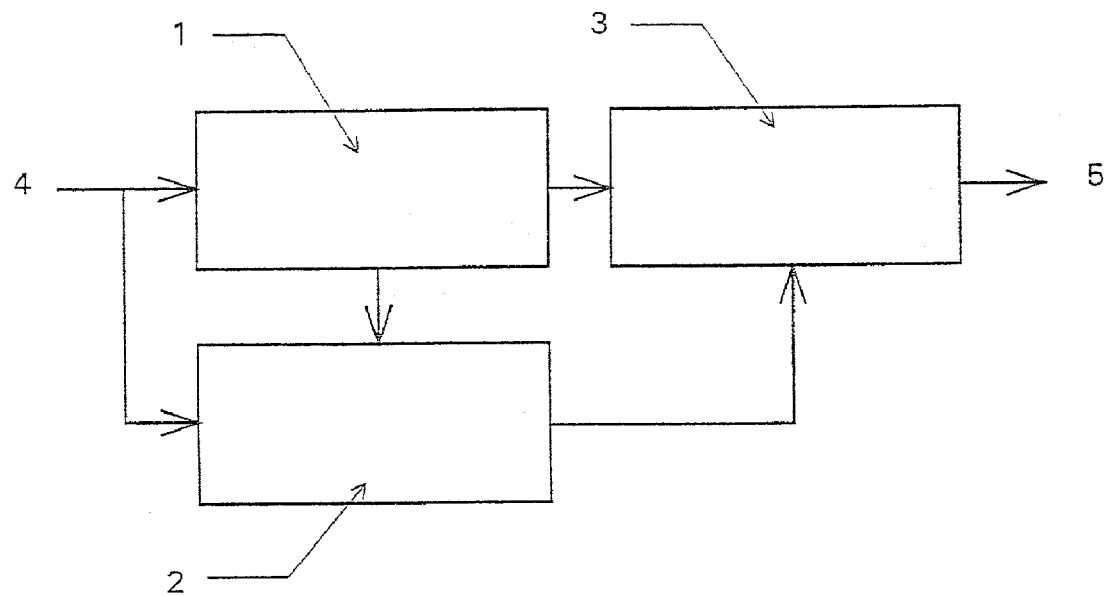
FIG. 1 shows a block diagram of the device according to the present invention, for estimating memory-enabled transmission channels.

FIG. 1 shows a channel estimator 1 as well as a parallelly situated interference estimator 2, both of which receive a received signal 4, and shows a channel estimation correcting element 3, which corrects the signal from channel estimator 1 with the aid of the output signal of interference estimator 2 and outputs channel estimation 5.

To further clarify the operating mode of the device of the present invention, a discrete-time communications system is given that transmits a reference signal $\underline{r}=(r_1, \ldots, r_L)$ for purposes of channel estimation. A data signal $\underline{s}=(s_1, \ldots, s_L)$, whose cross correlation to reference signal $\underline{r}$ tends to zero, can optionally be transmitted at the same time. This case is representative of CDMA systems, which simultaneously transmit reference information and data information using orthogonal CDMA codes. Power $P_S$ of data signal $\underline{s}$ is f-fold power $P_r$ of reference signal $\underline{r}$, i.e., $P_S=f \cdot P_r$. In this context, the state f=0 corresponds to systems that transmit reference signals and data signals separately with respect to time. The transmitted signal is transmitted via a static multi-path channel with the pulse response $\underline{h}=(h_1, \ldots, h_W)$, W being the number of chip pulses in CDMA, and with additive Gaussian noise $\underline{n}$, so that the following received signal results:

$$\underline{e}=(\underline{r}+\underline{s})*\underline{h}+\underline{n} \qquad \text{Equation (1)}$$

Then, N=L−W+1 is the length of received signal part $\underline{e}_{ref}=(e_{refstart}, \ldots, e_{refstart+N-1})$, which is not influenced by data transmitted before or after the reference signal. Furthermore, let $E=\|\underline{e}_{ref}\|$ be the entire received energy of the received signal that was influenced by the reference signal. The term L is a length of the chip pulse indicating the pulse frequency of an individual pulse in CDMA. Depending on the device, channel coefficients $h_k$, k0{1, ..., W}, of pulse response $\underline{h}$ are initially estimated by matched filter $\underline{r}*{-k}$ corresponding to received signal $\underline{r}$ to be $\hat{h}$:

$$\hat{\underline{h}} = \frac{1}{\gamma} \cdot G^{*T} \cdot \underline{e}_{ref}, \quad \text{Equation (2)}$$

where $$G = \begin{pmatrix} r_W & r_{W-1} & \cdots & r_1 \\ r_{W+1} & r_w & & r_2 \\ \cdot & \cdot & & \cdot \\ r_{W+N-1} & r_{W+N-2} & \cdots & r_N \end{pmatrix} \quad \text{Equation (3)}$$

and $$\gamma = \frac{N}{L} \cdot \|r\|^2. \quad \text{Equation (4)}$$

Figure 2:
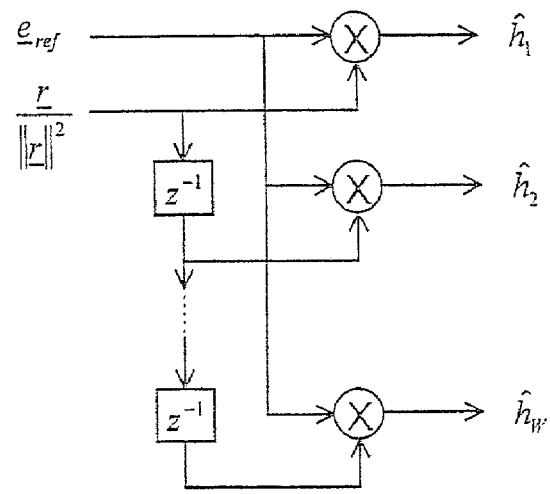
FIG. 2 shows the layout of a channel estimator.

The layout of this estimator is represented in FIG. 2, where $\gamma$ is a scaling factor for the received energy and G is a matrix for describing the channel characteristics.

Using the following equation, intensity $\sigma^2$ of the additive interferences is subsequently estimated to be:

$$\sigma^2 = \theta(E - (1+f) \cdot \gamma \cdot \|\underline{h}\|^2)/(N_{-}(1+f)) \quad \text{Equation (5)}$$

In this context, the following definition was met, where f is a frequency term:

$$\theta(x) = \begin{cases} x, & \text{if } x > 0 \\ \text{otherwise, } 0 \end{cases} \quad \text{Equation (6)}$$

Subsequently, the estimated channel coefficients $\hat{h}^k$, k 0 $\{1, \ldots, W\}$, of estimated pulse response $\hat{h}_k$ is corrected using the following formula:

$$\hat{h}_k = \sqrt{\theta(\hat{h}_k^2 - \sigma^2/\gamma)} \cdot \hat{h}_k/|\hat{h}_k|, \text{ if } \hat{h}_k \neq 0, \quad \text{Equation (7)}$$

and otherwise $$\hat{h}_k = 0 \quad \text{Equation (8)}$$

FIG. 2 shows the calculating scheme of the above described channel estimator having a matched filter structure. Since the diagram in the above was already explained and FIG. 2 is largely self-explanatory, it is not necessary to describe FIG. 2.

The invention claimed is:

1. A method for estimating a memory-enabled transmission channel, comprising the steps of:
   determining a first estimation $\hat{\underline{h}}$ of a pulse response of the memory-enabled transmission channel;
   performing an estimation of an intensity level $\sigma^2$ of an additive interference of the memory-enabled transmission channel; and
   performing a correction of the first estimation of the pulse response by taking into consideration the estimation of the intensity level $\sigma^2$ of the additive interference of the memory-enabled transmission channel, wherein an amount of correction of the first estimation varies depending on the estimated intensity level $\sigma^2$ of the additive interference.

2. The method according to claim 1, wherein:
   the step of determining the first estimation is performed by a matched filter.

3. The method according to claim 2, wherein:
   the matched filter is given by $$\hat{\underline{h}} = \frac{1}{\gamma} \cdot G^{*T} \cdot \underline{e}_{ref},$$

where $$G = \begin{pmatrix} r_W & r_{W-1} & \cdots & r_1 \\ r_{W+1} & r_w & & r_2 \\ \cdot & \cdot & & \cdot \\ r_{W+N-1} & r_{W+N-2} & \cdots & r_N \end{pmatrix}$$

and $$\gamma = \frac{N}{L} \cdot \|r\|^2$$

$\underline{r} = (r_1, \ldots, r_L)$ being a reference signal used for purposes of channel estimation, $\gamma$ is a scaling factor, N is a length of a receiving-signal portion, L is a length of a chip pulse, G is a channel characteristic matrix and $\underline{e}_{ref} = (e_{refstart}, \ldots e_{refstart+N-1})$ being a received signal part that is not influenced by data transmitted before and after the reference signal.

4. The method according to claim 1, wherein:
   the first estimation is given by a least squares estimation.

5. The method according to claim 4, wherein:
   the least squares estimation is given by $$\underline{\hat{h}} = (G^{*T} \cdot G)^{-1} \cdot G^{*T} \cdot \underline{e}_{ref}.$$

6. The method according to claim 1, wherein:
   the step of performing the estimation of the intensity level $\sigma^2$ of the additive interference is given by $$\sigma^2 = \theta(E_{-}(1+f) \cdot \gamma \cdot \|\underline{h}\|^2)/(N - (1+f))$$

with $$\theta(x) = \begin{cases} x, & \text{if } x > 0 \\ \text{otherwise, } 0 \end{cases}$$

wherein f is a frequency value, N indicates a length of a receiving-signal portion and E is an energy value.

7. The method according to claim 1, wherein:
   the correction of the first estimation $\hat{h}_k$ of the $k^{th}$ component, k 0 $\{1, \ldots, W\}$, of estimation vector $\underline{\hat{h}}$ of the pulse response $\underline{h}$ is given by $$\hat{h}_k = \begin{cases} 0, & \text{if } h_k^2 < \sigma^2/\gamma \\ \text{otherwise } h_k \end{cases}.$$

8. The method according to claim 1, wherein:
the correction of the first estimation $\hat{h}_k$ of the $k^{th}$ component, $k \in \{1, \ldots, W\}$, of estimation vector $\underline{\hat{h}}$ of the pulse response $\underline{h}$ is given by $$\hat{\hat{h}}_k = \sqrt{\theta(\hat{h}_k^2 - \sigma^2/\gamma)} \cdot \hat{h}_k/|\hat{h}|,$$

if $\hat{h}_k \cong 0$, and
otherwise $\hat{\hat{h}}_k = 0.$

9. The method according to claim 1, wherein:
the correction of the first estimation is given by a projected onto convex sets (POCS) algorithm.

10. The method according to claim 1, wherein:
the correction of the first estimation is given by a minimum mean square error (MMSE) algorithm.

11. The method according to claim 10, wherein:
the MMSE algorithm is given by $$\underline{\hat{h}} = (G^{*T} \cdot G + \sigma^2 \cdot I)^{-1} \cdot G^{*T} \cdot \underline{e}_{ref}$$

I being the unit matrix.

12. A device for estimating a memory-enabled transmission channel, comprising:
a channel estimator;
an estimator of an intensity level $\sigma^2$ of an additive interference, the channel estimator and the estimator of the additive interference act on a received signal; and
channel estimation correcting element for correcting a signal of the channel estimator by taking into consideration an output signal of the estimator of the intensity level $\sigma^2$ of the additive interference of the memory-enabled transmission channel, wherein an amount of correction of the signal varies depending on the estimated intensity level $\sigma^2$ of the additive interference.

* * * * *